(12) United States Patent
Jacob (10) Patent No.: US 10,260,450 B2
(45) Date of Patent: Apr. 16, 2019

(54) CYLINDER HEAD

(71) Applicant: GE Jenbacher GmbH & Co OG, Jenbach (AT)

(72) Inventor: Raphael Jacob, Pfaffenhofen (DE)

(73) Assignee: GE Jenbacher GmbH & Co OG, Jenbach (AT)

( * ) Notice: Subject to any disclaimer, the term of this patent is extended or adjusted under 35 U.S.C. 154(b) by 8 days.

(21) Appl. No.: 15/050,863

(22) Filed: Feb. 23, 2016

(65) Prior Publication Data

US 2016/0252045 A1   Sep. 1, 2016

(30) Foreign Application Priority Data

Feb. 27, 2015   (AT) .............................. A 50160/2015

(51) Int. Cl.
| | |
|---|---|
| *F02F 1/24* | (2006.01) |
| *F02M 21/02* | (2006.01) |
| *F02B 19/10* | (2006.01) |
| *F02B 19/12* | (2006.01) |
| *F02P 15/00* | (2006.01) |

(52) U.S. Cl.
CPC ............ *F02F 1/242* (2013.01); *F02B 19/108* (2013.01); *F02B 19/12* (2013.01); *F02M 21/0242* (2013.01); *F02M 21/0269* (2013.01); *F02M 21/0275* (2013.01); *F02M 21/0281* (2013.01); *F02P 15/00* (2013.01); *Y02T 10/125* (2013.01); *Y02T 10/32* (2013.01)

(58) Field of Classification Search
CPC ......... F02F 1/242; F02B 19/12; F02B 19/108; F02P 15/00; F02M 21/0269; F02M 21/0242; F02M 21/0275; F02M 21/0281; Y02T 10/32; Y02T 10/125
See application file for complete search history.

(56) References Cited

U.S. PATENT DOCUMENTS

| | | | | |
|---|---|---|---|---|
| 3,406,667 A | * | 10/1968 | Evans ................. | F02B 19/1004 123/143 A |
| 4,903,656 A | * | 2/1990 | Nakazono ........... | F02B 19/1014 123/253 |

(Continued)

FOREIGN PATENT DOCUMENTS

| | | |
|---|---|---|
| DE | 10 2014 000 229 | 7/2014 |
| JP | 4-171256 | 6/1992 |

(Continued)

OTHER PUBLICATIONS

Austrian Search Report dated Aug. 17, 2015 in corresponding Austrian Patent Application No. 50160/2015 (with English translation).

(Continued)

*Primary Examiner* — Joseph J Dallo
*Assistant Examiner* — Kurt Philip Liethen
(74) *Attorney, Agent, or Firm* — GE Global Patent Operation; Rita D. Vacca (57) ABSTRACT

A cylinder head comprising at least one pre-chamber, at least one spark plug projecting into the pre-chamber, and at least one pre-chamber gas valve opening into the pre-chamber, wherein the spark plug and the pre-chamber gas valve are arranged in a common cavity of the cylinder head, wherein the spark plug and the pre-chamber gas valve are arranged in bores which mutually pass through each other.

13 Claims, 8 Drawing Sheets

(56) References Cited

U.S. PATENT DOCUMENTS

| | | | | |
|---|---|---|---|---|
| 5,024,193 A * | 6/1991 | Graze, Jr. | ............ | F02D 41/0027 |
| | | | | 123/259 |
| 5,222,993 A * | 6/1993 | Crane | ..................... | F02B 19/12 |
| | | | | 123/256 |
| 7,950,364 B2 * | 5/2011 | Nerheim | ............. | F02B 19/1014 |
| | | | | 123/259 |
| 8,857,405 B2 * | 10/2014 | Attard | ..................... | F02B 19/12 |
| | | | | 123/261 |
| 9,353,674 B2 * | 5/2016 | Bunce | ................ | F02B 19/1057 |
| 2014/0196686 A1 | 7/2014 | Coldren et al. | | |

FOREIGN PATENT DOCUMENTS

| | | | |
|---|---|---|---|
| JP | 04171256 A | * | 6/1992 |
| WO | 2004/099584 | | 11/2004 |

OTHER PUBLICATIONS

Search Report dated Aug. 1, 2016 in corresponding European Application No. EP 16 15 6829.
U.S. Appl. No. 29/565,459, filed May 20, 2016.

* cited by examiner

CYLINDER HEAD

BACKGROUND OF THE INVENTION

The invention concerns a cylinder head and an internal combustion engine having such a cylinder head.

Cylinder heads and internal combustion engines of the general kind set forth are already known from the state of the art. As from a given bore (about 150 mm) internal (gas) combustion engines are fitted with a pre-chamber for ignition boosting. An ignition source which projects into the pre-chamber ignites the mixture which is present there and which is relatively rich in the case of a flushed pre-chamber, whereby ignition flares pass from the pre-chamber into a main combustion chamber and ignite the mixture present there.

JP H 04171256 A discloses a valve comprising a valve body, a valve spring, a valve needle and a lower cavity which is supplied with gas. There is also an upper cavity in which the valve spring is arranged. Here a cap serves as a seal for the upper valve cavity, the cap being pulled over and screwed onto the upper cavity only thereby creating the upper cavity. The spark plug and the pre-chamber gas valve are arranged together in the same cavity. This can result in poor stability in smaller constructions.

DE 10 2004 000 229 A1 shows an injection system which injects gas on the one hand and Diesel fuel on the other. No common cavity for the spark plug and for the pre-chamber gas valve is shown.

There are various design concepts for supplying fuel to pre-chambers. In the case of non-flushed pre-chambers, in the compression stroke mixture is urged out of the main combustion chamber into the pre-chamber.

In the case of flushed pre-chambers there is also the possibility of an additional supply with fuel. That separate fuel supply can in turn be effected by way of passive valves (check valves) or active valves.

The packaging, that is to say the spatial arrangement of the components and supply lines which are required for a flushed pre-chamber concept, in the cylinder head, is demanding. To deal with the space problems there are approaches involving making the pre-chamber gas valves particularly small. That entails problems with service life as miniaturized pre-chamber gas valves are more susceptible to clogging or sticking of the moveable parts.

A further proposal in regard to the arrangement of the pre-chamber gas valve and the spark plug sleeve involves positioning the pre-chamber gas valve spaced relatively far from the pre-chamber, thereby giving a long passage from the pre-chamber gas valve to the mouth opening thereof into the pre-chamber. That can be disadvantageous for the reason that this gives rise to a large unflushed volume, a so-called dead space, which contributes markedly to soot formation in the pre-chamber gas combustion.

SUMMARY OF THE INVENTION

The object of the present invention is therefore to provide a cylinder head and an internal combustion engine, in which the disadvantages known from the state of the art are alleviated.

That object is attained by a cylinder head having the features described below, and an internal combustion engine having such a cylinder head.

The fact that the spark plug and the pre-chamber gas valve are disposed in a common cavity of the cylinder head provides a particularly compact arrangement of the pre-chamber gas valve and the shaft for accommodating the spark plug.

It can be provided that the common cavity is cylindrical. The cavity can also be composed of a plurality of cylindrical portions. They do not all have to be parallel to each other.

According to the invention it is provided that the spark plug and the pre-chamber gas valve are arranged in bores which mutually pass through each other. That embraces the situation where the bores for accommodating the spark plug and the pre-chamber gas valve respectively are spatially positioned relative to each other in such a way that the bores pass through each other. As a result the spark plug and the pre-chamber gas valve can be positioned particularly closely to each other. This means that the bores for the reception of the spark plug and for the reception of the pre-chamber gas valve intersect each other with their lateral surfaces which results in a greater stability of the valve body, particularly with smaller constructions.

It is preferably provided that the cavity is arranged in the spark plug sleeve. Internal combustion engines of the general kind set forth are in most cases designed in such a way that the spark plug is not screwed directly into the cylinder head, but there is a spark plug sleeve for receiving the spark plug. The preferred embodiment therefore provides that the common cavity is adapted to accommodate the spark plug and the pre-chamber gas valve in the spark plug sleeve.

It can be provided that sealing of the pre-chamber gas valve relative to the cylinder head or the spark plug sleeve is effected over the periphery of the pre-chamber gas valve. Therefore a radial sealing concept is proposed as a preferred embodiment, in which sealing of the pre-chamber gas valve is effected by way of a peripheral surface of the pre-chamber gas valve. That is in contrast to axial sealing concepts in which sealing is effected by way of an end face of the pre-chamber gas valve.

In that respect it can be provided that sealing of the pre-chamber gas valve is implemented by way of at least one O-ring.

It is preferably provided that the at least one O-ring is arranged in an opening formed by projections at the outside wall of the pre-chamber gas valve. In contrast to grooves in the wall of the pre-chamber gas valve therefore it is provided that projections are formed at the wall of the pre-chamber gas valve. Provided between those projections which preferably extend in peripheral relationship is an opening which can accommodate an O-ring. If there is more than one O-ring then correspondingly more projections are provided.

Advantages of the present invention are in particular:
 the pre-chamber gas valve is close to the pre-chamber so that the dead space is minimized,
 the pre-chamber gas valve is close to the spark plug particularly compact structure,
 the invention can also be used in the case of smaller internal combustion engines (especially where packaging is problematic),
 central position of the spark plug sleeve which is desirable in terms of flow configuration and combustion, and
 interchangeability of the spark plug with the pre-chamber gas valve fitted in place.

BRIEF DESCRIPTION OF THE DRAWINGS

The invention is illustrated in greater detail by the Figures in which.

DETAILED DESCRIPTION OF THE INVENTION

Figure 1A:
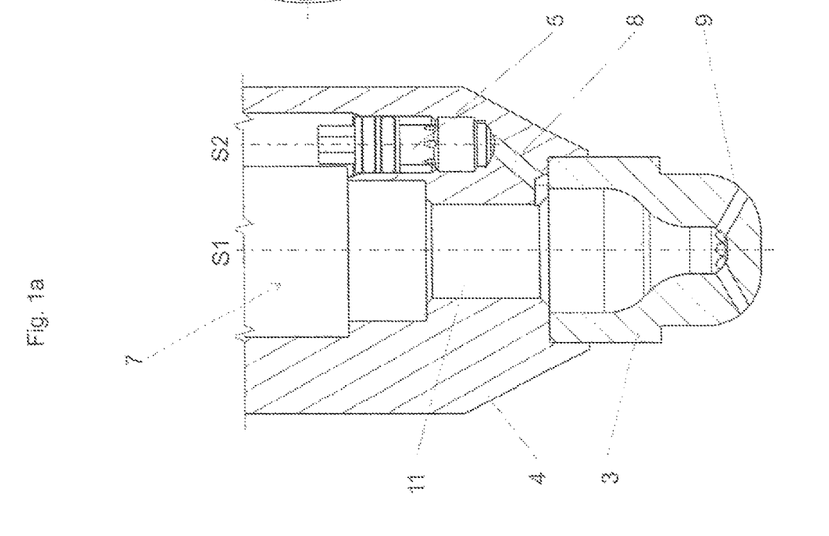
FIGS. 1a through 1c show a spark plug according to a first embodiment.
Figure 1B:
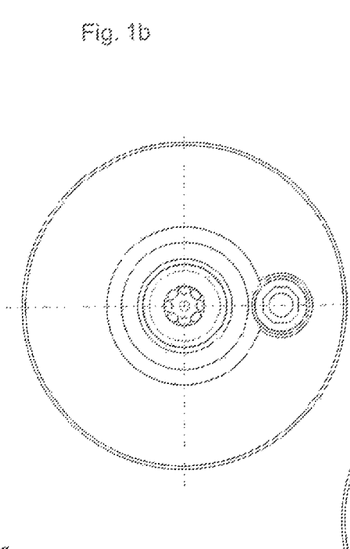
Figure 1C:
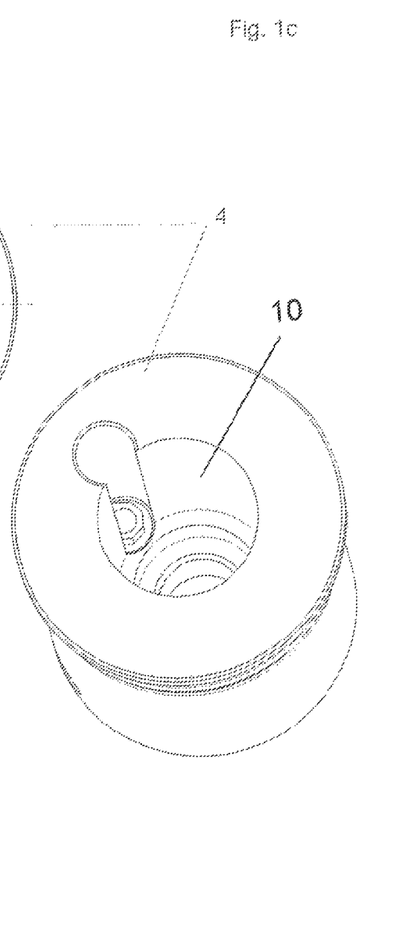

FIGS. 1a through 1c show a spark plug sleeve 4 according to a first embodiment in three views.

Thus, FIG. 1a shows a longitudinal section through the cavity 7 which accommodates a spark plug 6 (not shown) and a pre-chamber gas valve 5. In this embodiment, the cavity 7 is in a spark plug sleeve 4.

The cavity 7 includes on the one hand a shaft which is concentric around the axis of symmetry S1, consisting of cylinder portions, for receiving a spark plug 6.

The cavity 7 further has a bore 10 with an axis of symmetry S2 for receiving a pre-chamber gas valve 5.

A passage 8 leads from the pre-chamber gas valve 5 to the pre-chamber 3. The pre-chamber 3 comprises on the one hand the actual cavity, that is to say the hollow space in which the ignition of mixture takes place. The pre-chamber 3 is of course also a physical component. In the present embodiment the pre-chamber 3 is in the form of a component separate from the spark plug sleeve 4 and is connected to the spark plug sleeve 4, for example by pressing.

The spark plug 6 which is not shown for the sake of clarity is introduced into the spark plug sleeve 4 by way of the shaft concentric with the axis of symmetry S1, in such a way that it terminates flush with the pre-chamber 3 and its electrode (s) project into the pre-chamber 3. The pre-chamber 3 is enriched with combustion gas by the pre-chamber gas valve 5 by way of the passage 8. After ignition in the pre-chamber 3 ignited mixture passes by way of the flow transfer bores 9 into the main combustion chamber (not shown).

FIG. 1b shows a plan view of the view in FIG. 1a. It is possible to see the parallel cylindrical shafts disposed within the cavity 7 for receiving a spark plug 6 and a pre-chamber gas valve 5. The spark plug 6 is not shown, as explained with reference to FIG. 1a. It is possible to see in the pre-chamber gas valve 5 an octagon with which the pre-chamber gas valve 5 is screwed into the spark plug sleeve 4.

FIG. 1c shows a perspective view of the spark plug sleeve 4 of this embodiment.

In the installed condition the spark plug sleeve 4 is fitted into a cylinder head 2 of an internal combustion engine (not shown here). The bore 10 of the pre-chamber gas valve 5 passes through the spark plug bore 11 in the upper portion thereof, of the largest diameter. That will be particularly clearly apparent from the views in FIGS. 1b and 1c. In a plan view (FIG. 1b) therefore the bore 10 for receiving the pre-chamber gas valve 5 and the bore for receiving the spark plug 6 overlap.

Figure 2A:
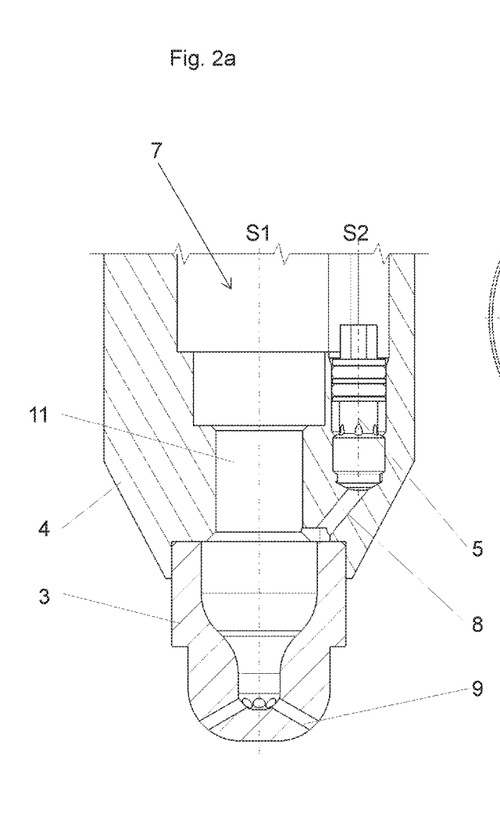
FIGS. 2a through 2c show a spark plug sleeve according to a further embodiment.
Figure 2B:
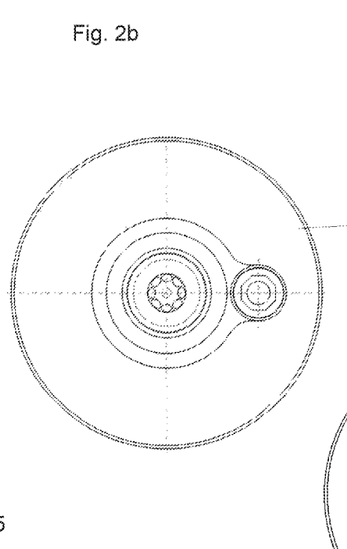
Figure 2C:
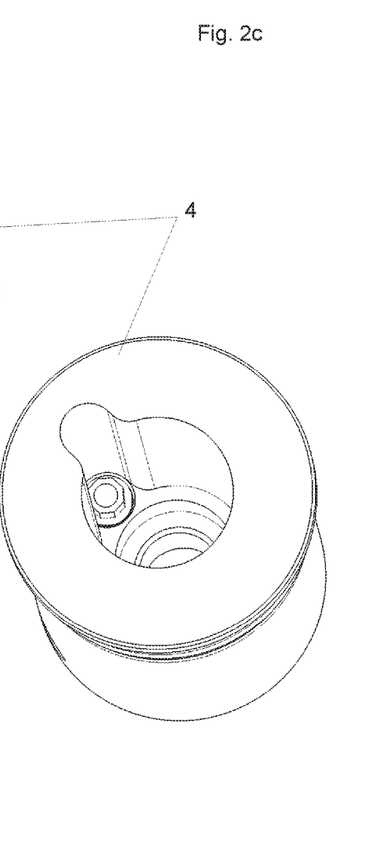

FIGS. 2a through 2c show a further embodiment of a spark plug sleeve 4 which can be inserted into a cylinder head 2. Here the bores for receiving a spark plug 6 and for receiving the pre-chamber gas valve 5 pass through each other. In comparison with the embodiment shown in FIGS. 1a through 1c here the contour of the cavity 7 is altered. Here the contour of the cavity 7 is of such a configuration that the cylindrical bores for receiving the spark plug 6 and the pre-chamber gas valve 5 blend fluidly into each other. In other words, the sharp transitions of the embodiment of FIGS. 1a through 1c are here replaced by a smooth radius in the transition of the two bores.

Figure 3A:
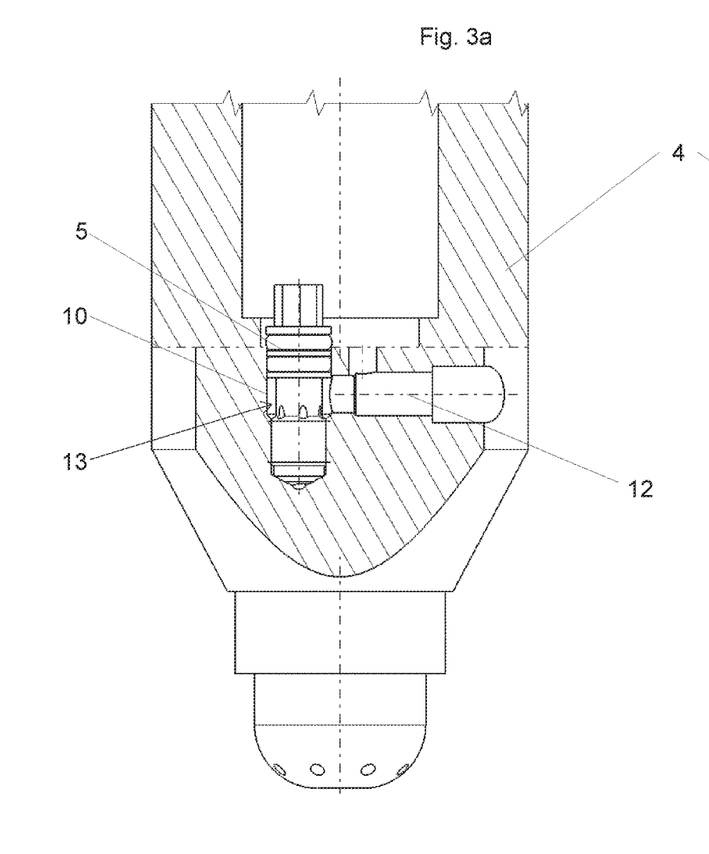
FIGS. 3a through 3e show a spark plug sleeve, with details relating to the gas feed concept.
Figure 3B:
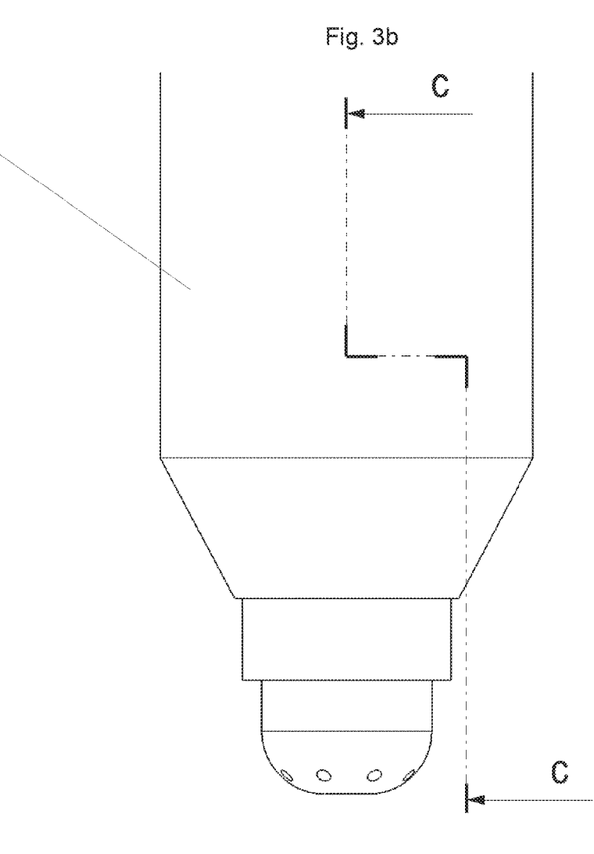

FIG. 3a shows a section through a spark plug sleeve 4, wherein the section was so positioned that the gas feed to the pre-chamber gas valve 5 is clearly illustrated. The section line is sketched in FIG. 3b. It is possible to see the gas feed passage 12, as it opens into the bore 10 carrying the pre-chamber gas valve 5. The bore 10 together with the pre-chamber gas valve 5 forms an annular passage 13 into which the gas feed passage 12 opens. From the annular passage 13 formed by the wall 10A and the pre-chamber gas valve 5, the inflowing gas is guided uniformly into the pre-chamber gas valve 5.

Figure 3C:
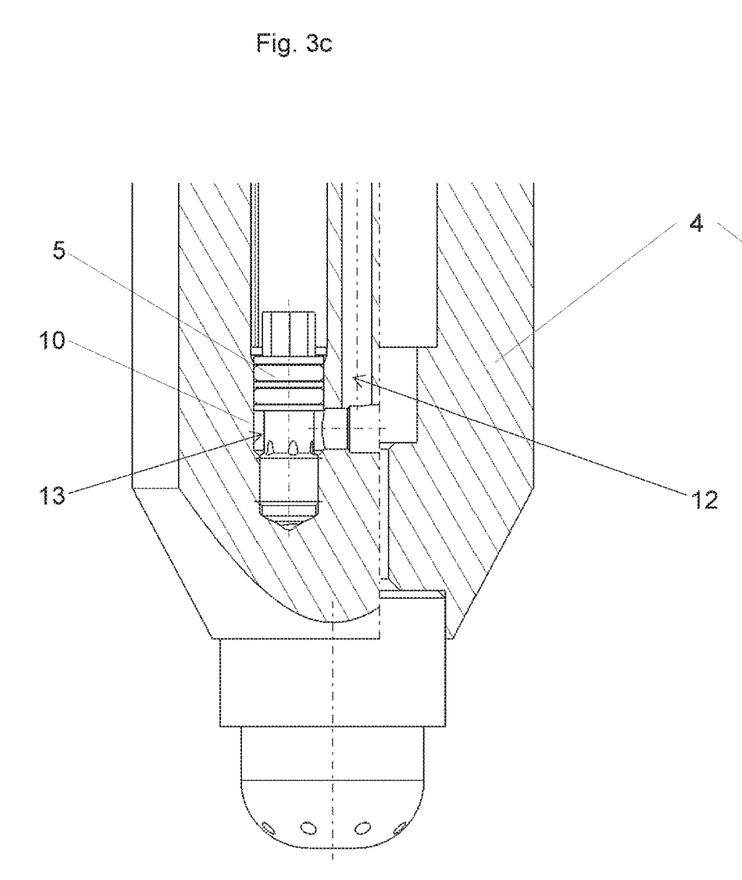
Figure 3D:
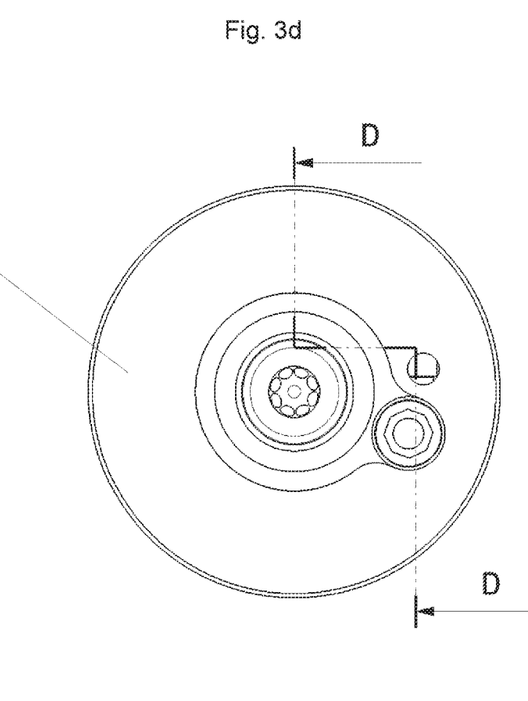

FIG. 3c shows a longitudinal section through the spark plug sleeve 4. The section line can be seen from FIG. 3d. As can be seen from FIG. 3c the sectioning is here so selected that it is also possible to see the part of the gas feed passage 12, that extends parallel to the axis of symmetry S1.

Figure 3E:
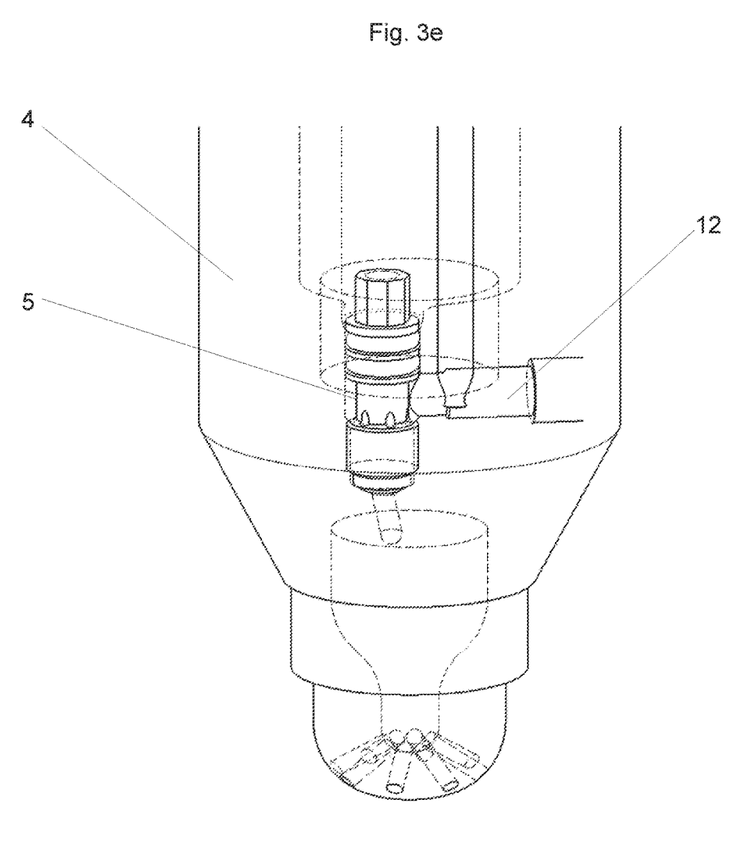

FIG. 3e is an isometric perspective view showing the arrangement of the pre-chamber gas valve 5 and its gas supply. The gas supply is afforded by the horizontal and the vertical portions of the gas feed passage 12.

Figure 4A:
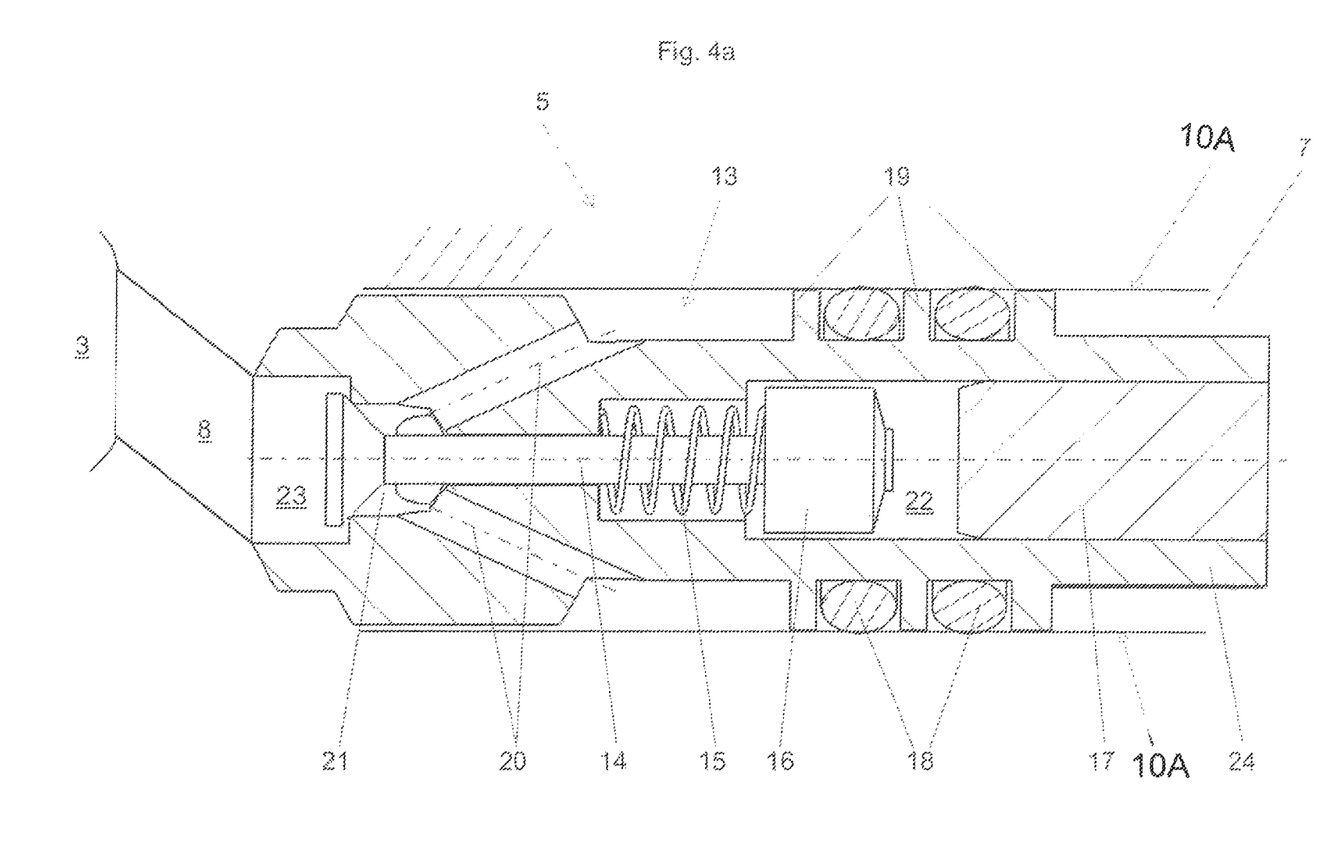
FIGS. 4a and 4b show a pre-chamber gas valve and a variant thereof.

FIG. 4a shows a sectional view of the pre-chamber gas valve 5. It is possible to clearly see the annular passage 13 formed between the wall 10A of the cavity 7 and the outside contour of the pre-chamber gas valve 5. The wall 10A can be formed either by the cylinder head 2 itself or by a spark plug sleeve 4 fitted into the cylinder head 2.

The valve needle 14 is braced against its seat by the spring 15. The cap 16 embraces the spring 15 and is connected to the valve needle 14 for example by way of a beam welding.

The plug 17 closes and seals off the pre-chamber gas valve 5 upwardly. Sealing of the annular passage 13 with respect to the cavity 7 is effected radially by way of the O-rings 18. They are arranged in annular receiving means formed by the projections 19. The sealing concept of the pre-chamber gas valve 5 shown here therefore provides that sealing of the pre-chamber gas valve 5 is effected radially, that is to say by way of the outside surface of the pre-chamber gas valve 5.

Figure 4B:
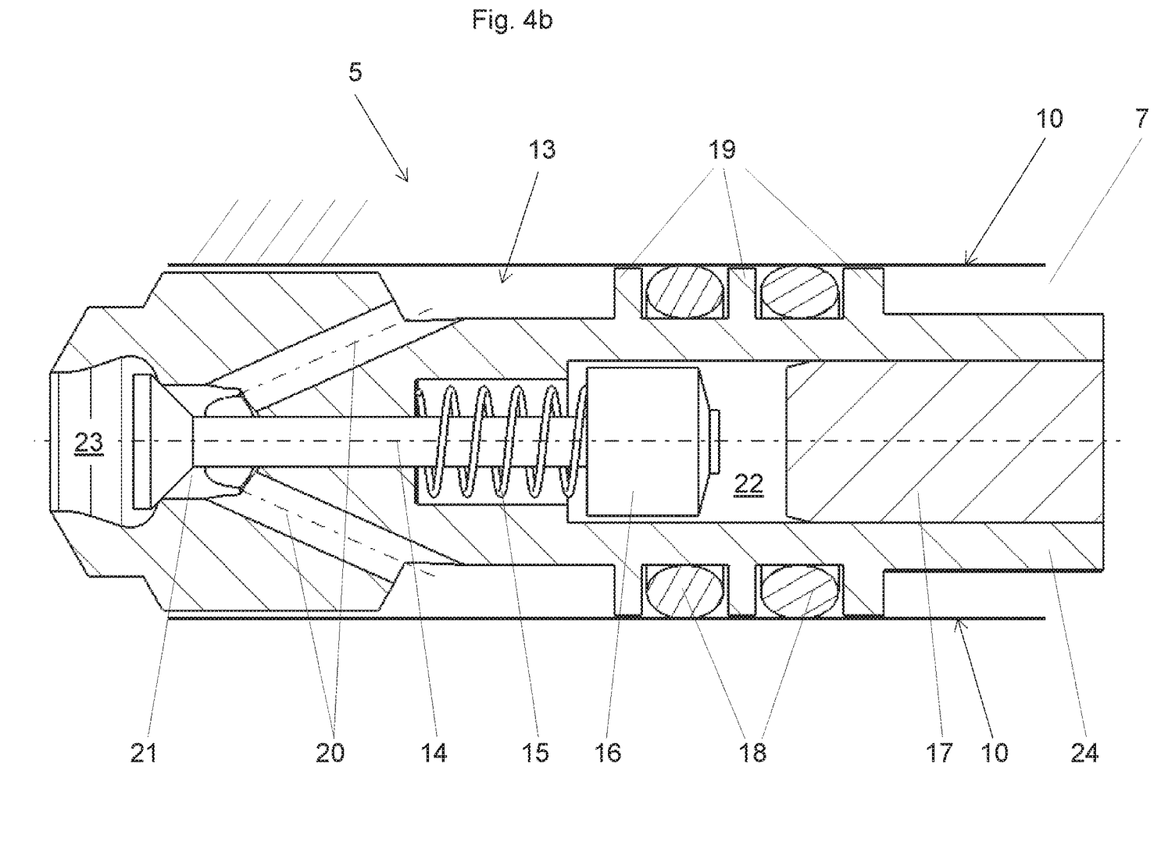

FIG. 4b shows a variant of FIG. 4a in which the space 23 is of a very substantially pear-shaped configuration narrowing towards the pre-chamber 3. That configuration is particularly advantageous from the fluidic point of view.

Figure 5:
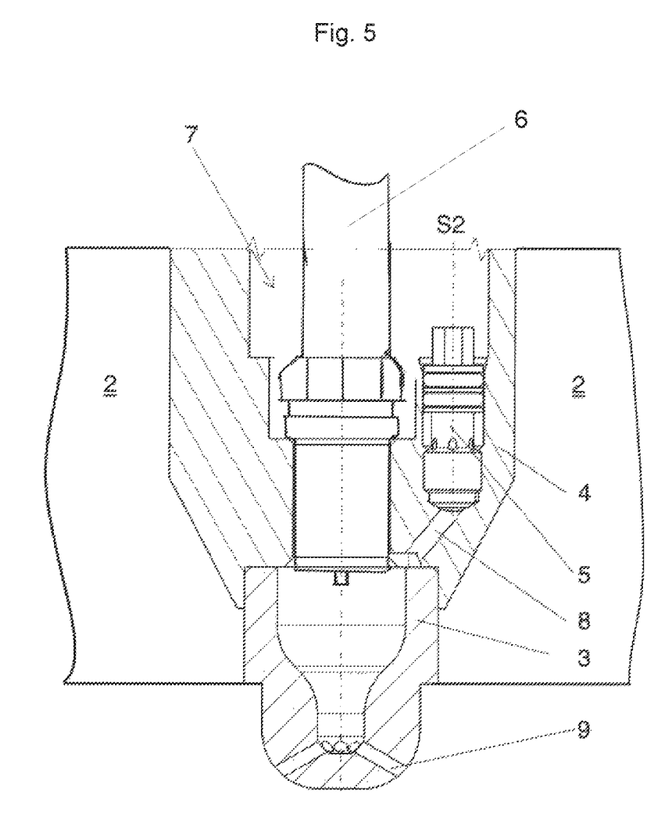
FIG. 5 shows a situation as shown in FIG. 1a with fitted spark plug.

FIG. 5 shows a view as shown in FIG. 1a, here with an illustrated spark plug 6.

LIST OF REFERENCES USED 2 cylinder head
3 pre-chamber
4 spark plug sleeve
5 pre-chamber gas valve
6 spark plug
7 cavity
8 passage
9 flow transfer bore
10 wall of the cavity 7
11 spark plug bore
12 gas feed passage
13 annular passage
14 valve needle
15 valve spring
16 cap
17 plug
18 O-ring 19 projection
20 gas passage
21 lower cavity of the pre-chamber gas valve
22 upper cavity of the pre-chamber gas valve
23 space
24 valve body
S1 axis of symmetry
S2 axis of symmetry

The invention claimed is:

1. A cylinder head comprising:
   at least one pre-chamber;
   at least one spark plug projecting into the at least one pre-chamber; and
   at least one pre-chamber gas valve opening into the at least one pre-chamber;
   wherein the at least one spark plug and the at least one pre-chamber gas valve are each arranged in a common cavity of the cylinder head, and wherein the at least one pre-chamber gas valve is arranged in a longitudinally extending valve bore defined by a first circumference and the at least one spark plug is arranged in a longitudinally extending plug bore defined by a second circumference parallel with respect to the longitudinally extending valve bore, with the valve bore first circumference and the plug bore second circumference mutually intersecting and overlapping each other.

2. The cylinder head of claim 1, wherein the at least one spark plug is arranged in a spark plug sleeve, and the common cavity is arranged in the spark plug sleeve.

3. The cylinder head of claim 1, wherein sealing of the at least one pre-chamber gas valve relative to the cylinder head or the spark plug sleeve is effected over a periphery of the at least one pre-chamber gas valve.

4. The cylinder head of claim 3, wherein sealing of the at least one pre-chamber gas valve is through use of at least one O-ring.

5. The cylinder head of claim 4, wherein the at least one O-ring is arranged in an opening formed by projections at an outside wall of the at least one pre-chamber gas valve.

6. An internal combustion engine having the cylinder head of claim 1.

7. The cylinder head of claim 2, wherein sealing of the at least one pre-chamber gas valve relative to the cylinder head or the spark plug sleeve is effected over a periphery of the at least one pre-chamber gas valve.

8. An internal combustion engine having the cylinder head of claim 2.

9. An internal combustion engine having the cylinder head of claim 3.

10. An internal combustion engine having the cylinder head of claim 4.

11. An internal combustion engine having the cylinder head of claim 5.

12. The cylinder head of claim 1, wherein a sharp transition exists between the valve bore and the plug bore.

13. The cylinder head of claim 1, wherein the valve bore blends fluidly in a smooth radius with the plug bore.

* * * * *